United States Patent
Hatch et al.

(10) Patent No.: US 7,212,155 B2
(45) Date of Patent: May 1, 2007

(54) GPS NAVIGATION USING SUCCESSIVE DIFFERENCES OF CARRIER-PHASE MEASUREMENTS

(75) Inventors: Ronald R. Hatch, Wilmington, CA (US); Richard T. Sharpe, Torrance, CA (US); Yunchun Yang, Harbor City, CA (US)

(73) Assignee: Navcom Technology, Inc., Torrance, CA (US)

( * ) Notice: Subject to any disclaimer, the term of this patent is extended or adjusted under 35 U.S.C. 154(b) by 300 days.

(21) Appl. No.: 10/841,689

(22) Filed: May 7, 2004

(65) Prior Publication Data
US 2005/0248485 A1    Nov. 10, 2005

(51) Int. Cl.
*G01S 5/14* (2006.01)
(52) U.S. Cl. .............................. 342/357.12; 342/357.01
(58) Field of Classification Search ........... 342/357.01, 342/357.06, 357.08, 357.12; 701/207, 213
See application file for complete search history.

(56) References Cited

U.S. PATENT DOCUMENTS

| | | | |
|---|---|---|---|
| 5,451,964 A * | 9/1995 | Babu ...................... | 342/357.06 |
| 5,548,293 A | 8/1996 | Cohen ......................... | 342/357 |
| 5,757,646 A | 5/1998 | Talbot et al. ............. | 364/449.9 |
| 6,014,101 A * | 1/2000 | Loomis ................. | 342/357.02 |
| 6,181,274 B1 * | 1/2001 | Pratt et al. ............. | 342/357.04 |
| 6,342,853 B1 | 1/2002 | Kalafus et al. ........ | 342/357.03 |
| 6,417,802 B1 * | 7/2002 | Diesel ................... | 342/357.14 |
| 6,864,836 B1 | 3/2005 | Hatch et al. ........... | 342/357.15 |

OTHER PUBLICATIONS

PCT Search Report dated Jul. 5, 2005, International Application No. PCT/US2005/007259, International Filing Date Mar. 3, 2005.
Van Graas, F., et al., "High-Accuracy Differential Positioning for Satellite-Based Systems Without Using Code-Phase Measurements," J. of the Institute of Navigation, vol. 42, No. 4, Winter 1995, pp. 605-618.
Chapt. 7, Sec. 7.8, "Ambiguity Fixing," *GPS Satellite Surveying*, 3rd Ed., Editor—Alfred Leick, 2004, pp. 277-293.
Chapt. 4, "Least Squares Adjustments," *GPS Satellite Surveying*, 3rd Ed., Editor—Alfred Leick, 2004, pp. 92-169.

* cited by examiner

*Primary Examiner*—Dao L. Phan
(74) *Attorney, Agent, or Firm*—Morgan, Lewis & Bockius LLP

(57) ABSTRACT

The present invention includes a process for navigating an object according to signals from satellites by propagating the position of the object forward in time using successive changes in the carrier-phase measurements. The process computes at a low rate matrices required for solving for the position of the objects, and repeatedly uses the most recently computed matrices to compute position updates at a high rate until the next low-rate computation is completed.

20 Claims, 7 Drawing Sheets

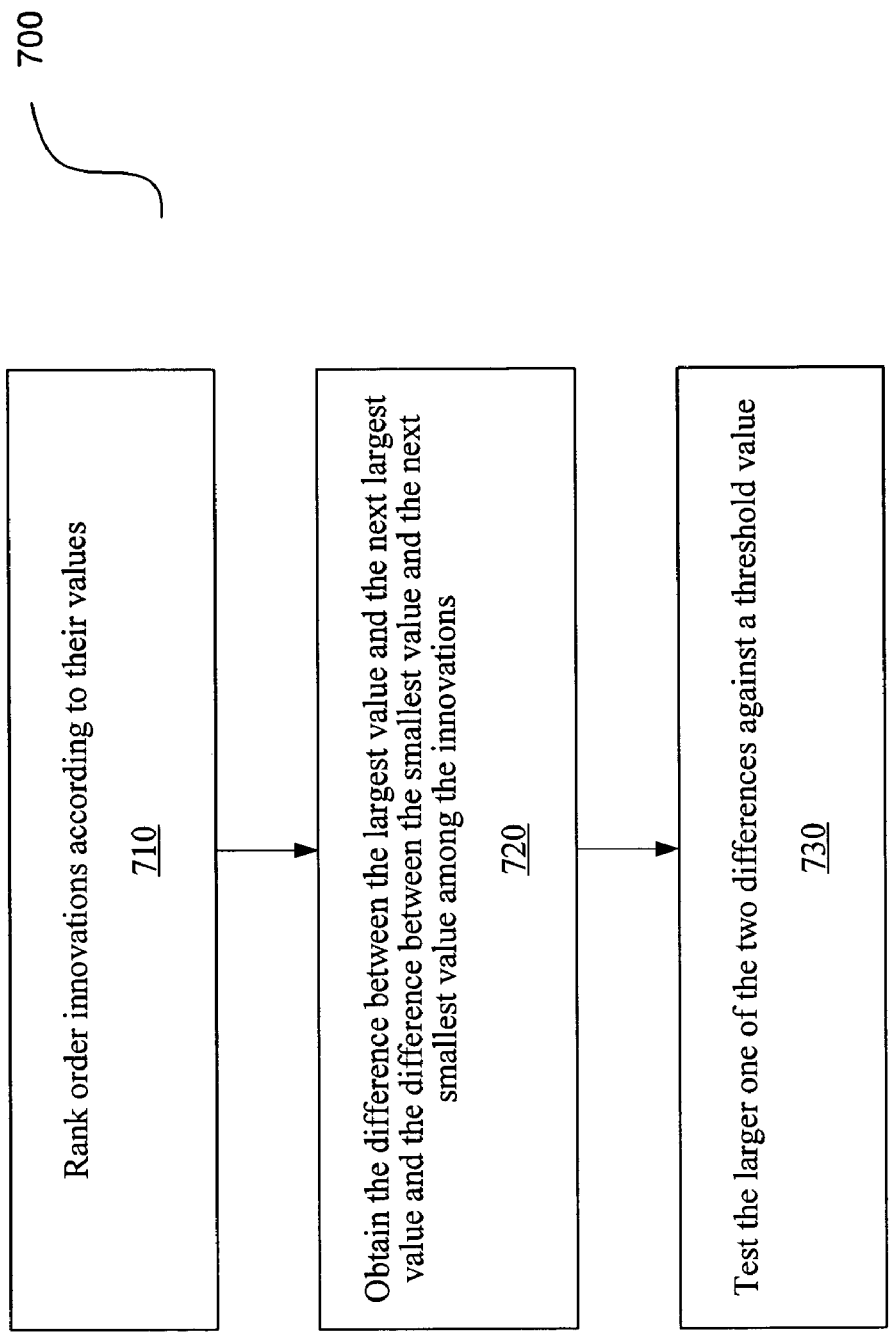

GPS NAVIGATION USING SUCCESSIVE DIFFERENCES OF CARRIER-PHASE MEASUREMENTS

The present invention relates generally to technologies associated with positioning and navigation using satellites, and more particularly to navigation using successive differences of carrier-phase measurements.

BACKGROUND

Satellite positioning systems such as the global positioning system (GPS) use satellites in space to locate objects on earth. With GPS, signals from the satellites arrive at a GPS receiver and are used to determine the position of the GPS receiver. Currently, two types of GPS measurements corresponding to each correlator channel with a locked GPS satellite signal are available for civilian GPS receivers. The two types of GPS measurements are pseudorange, and integrated carrier phase for two carrier signals, L1 and L2, with frequencies of 1.5754 GHz and 1.2276 GHz, or wavelengths of 0.1903 m and 0.2442 m, respectively. The pseudorange measurement (or code measurement) is a basic GPS observable that all types of GPS receivers can make. It utilizes the C/A or P codes modulated onto the carrier signals. The measurement records the apparent time taken for the relevant code to travel from the satellite to the receiver, i.e., the time the signal arrives at the receiver according to the receiver clock minus the time the signal left the satellite according to the satellite clock.

The carrier phase measurement is obtained by integrating a reconstructed carrier of the signal as it arrives at the receiver. Thus, the carrier phase measurement is also a measure of a transit time difference as determined by the time the signal left the satellite according to the satellite clock and the time it arrives at the receiver according to the receiver clock. However, because an initial number of whole cycles in transit between the satellite and the receiver when the receiver starts tracking the carrier phase of the signal is usually not known, the transit time difference may be in error by multiple carrier cycles, i.e., there is a whole-cycle ambiguity in the carrier phase measurement. Various techniques have been developed to resolve this whole-cycle ambiguity. An excellent overview of such techniques is found in Chapter 7, Section 7.8, "Ambiguity Fixing," in *GPS Satellite Surveying*, $3^{rd}$ edition, by Alfred Leick, published by John Wiley & Sons, New York, 2004.

Thus, to navigate an object, a GPS receiver attached to the object receives GPS measurements from a multitude of satellites and these GPS measurements are processed by a computer system coupled to the GPS receiver to produce updates to the position of the object. To compute the updates to the position of the object, the range or distance between the GPS receiver and each of the multitude of satellites is calculated by multiplying a signal's travel time by the speed of light. These ranges are usually referred to as pseudoranges (false ranges) because the receiver clock generally has a significant time error which causes a common bias in the measured range. This common bias from the receiver clock error can be solved for along with the position coordinates of the GPS receiver as part of the normal navigation computation. Various other factors can also lead to errors or noise in the calculated range, including ephemeris error, satellite clock timing error, atmospheric effects, receiver noise and multipath error. With standalone GPS navigation, where the GPS receiver obtains code and/or carrier-phase ranges with respect to a plurality of satellites in view, without consulting with any reference station, one is usually very limited in ways to reduce the errors or noises in the ranges.

To eliminate or reduce these errors, differential operations are typically used in GPS applications. Differential GPS (DGPS) operations involve a base or reference station having a base or reference GPS receiver, a navigation system having a rover or navigation GPS receiver attached to the object being navigated, and a communication link between the reference station and the navigation system. The reference station is usually at a known position and the measurements obtained and/or corrections computed thereat are transmitted to and used by the navigation system to cancel out most of the error factors. Differential operations using carrier-phase measurements are often referred to as real-time kinematic (RTK) positioning/navigation operations.

The fundamental concept of Differential GPS (DGPS) is to take advantage of the spatial and temporal correlations of the errors inherent in the GPS measurements to cancel the noise factors in the pseudorange and/or carrier phase measurements resulting from these error factors. However, while the GPS satellite clock timing error, which appears as a bias on the pseudorange or carrier phase measurement, is perfectly correlated between the reference receiver and the user receiver, most of the other error factors are either not correlated or the correlation diminishes in wide-area applications, i.e., when the distance between the reference and user receivers becomes large.

To overcome the inaccuracy of the DGPS system in wide-area applications, various regional, wide-area, or global DGPS (hereafter referred to as wide-area DGPS or WADGPS) techniques have been developed. The WADGPS includes a network of multiple reference stations in communication with a computational center or hub. Error corrections are computed at the hub based upon the known locations of the reference stations and the measurements taken by them. The computed error corrections are then transmitted to users via communication link such as satellite, phone, or radio. By using multiple reference stations, WADGPS provides more accurate estimates of the error corrections.

With the errors more or less corrected using any of the stand-alone, the RTK, and/or the WADGPS system, the computer system coupled to the navigation GPS receiver typically computes an update to the receiver position once in each of a series of epochs. A number of different techniques have been developed to update the position of the GPS receiver using the GPS carrier-phase measurements. Examples of these techniques are the least-squares and Kalman filter processes. The least-squares technique is addressed at length in Chapter 4, "Least Squares Adjustments," in *GPS Satellite Surveying*, $3^{rd}$ edition, by Alfred Leick, published by John Wiley & Sons, New York, 2004. The Kalman Filter is addressed briefly at the end of the chapter. In a conventional GPS navigation system, the position of the GPS receiver is typically updated at the rate of 1 Hertz, i.e., one update per second. For objects with moderate and high dynamics, it is often desired that the position updates are calculated at a higher rate. Because of the complexity of a full least-squares or Kalman filter process, however, the computational capabilities of the computer system can be exceeded if the position updates are computed at a rate significantly higher than the 1 Hertz rate. Therefore, there is a need for a satellite navigation technique that significantly increases the rate at which accurate position updates are produced while minimizing computational complexities.

SUMMARY

A process for navigating an object according to signals from satellites propagates the position of the object forward in time using successive changes in the carrier-phase measurements. The process computes at a low rate matrices required for solving for the position of the objects and repeatedly uses the most recently computed matrices to compute position updates at a high rate until the next low-rate computation is completed.

In one embodiment of the present invention, the process includes an initialization process for determining an initial position of the object and matrices for solving for the initial position. The process also includes a low-rate process for determining a position correction of the object and matrices for solving for the position correction once per each of a series of major epochs after the initialization process. The position correction and the matrices are queued for use by a high-rate process for determining a position update of the object once per each of a series of minor epochs after the initialization process. The position update in each minor epoch is determined based on the most recently queued matrices from the low-rate process and differences in carrier-phase measurements obtained at two consecutive minor epochs including the current minor epoch.

In one embodiment of the present invention, the process for navigating the object is performed in a so-called "maximum availability" mode of operation, in which the position corrections obtained at the low-rate are used to correct the position updates obtained at the high-rate. In this mode of operation, no corrections for ionospheric or tropospheric effects need to be used to correct the carrier-phase measurements used in computing the position updates in the high-rate process. So, only L1 carrier-phase measurements are used in the computation and satellites as low as a few degrees in elevation can be used. This allows a maximum number of satellites to be involved in the computation, and the computation results may be more robust and less noisy because the L1 signals are usually stronger and easier to obtain than the L2 signals.

In another embodiment of the present invention, the process for navigating the object is performed in a so-called "maximum accuracy" mode of operation, in which the position corrections obtained at the low-rate are not used to correct the position updates obtained at the high rate. Rather, the high-rate process runs in a relative position frame tied to a reference point. In order to minimize the error growth with time in the high-rate process, changes in the carrier-phase measurements used to compute the position updates are adjusted using all relevant information available, including but not limited to: (1) dual-frequency carrier-phase measurements to remove ionospheric refraction effects; (2) carefully modeled tropospheric effects; (3) satellite clock and orbit corrections provided by a wide-area or global satellite positioning system; etc. This mode of operation is very useful in situations where relative position updates instead of absolute position updates are desired. An example of a beneficial use of this mode of operation is in conjunction with a RTK system. It allows the RTK system, which provides navigation relative to the position of the RTK base receiver, to continue to operate in a relative navigation mode even when the communication link between the rover receiver and the base station, which supplies the corrections to the carrier-phase measurements, is interrupted.

BRIEF DESCRIPTION OF THE DRAWINGS

FIG. 7 is a flowchart illustrating a method for editing GPS measurements according to one embodiment of the present invention.

DESCRIPTION

Figure 1:
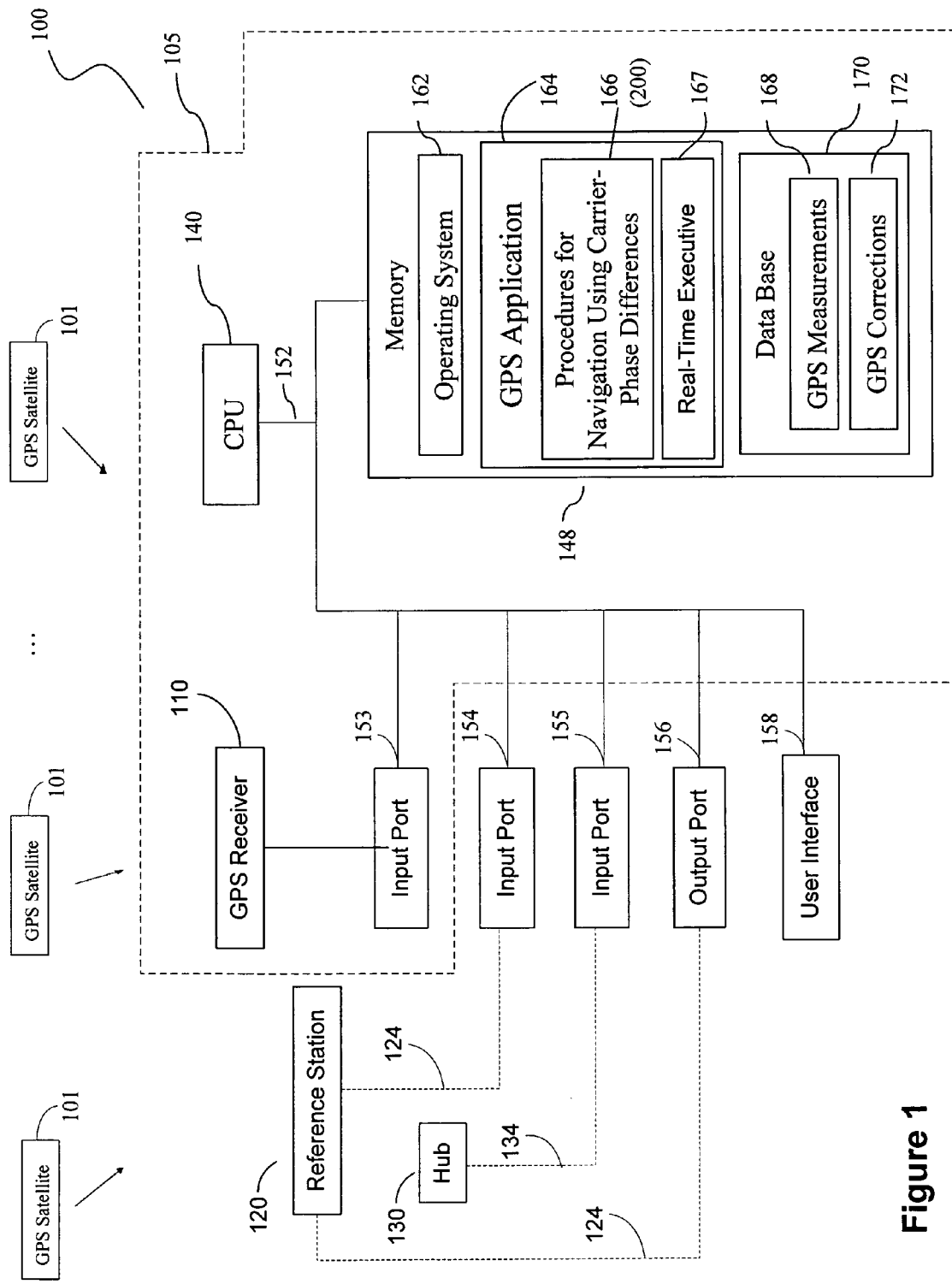
FIG. 1 is a block diagram of a satellite navigation system having a computer system coupled to a GPS receiver.

FIG. 1 illustrates a navigation system 100 for navigating a moving object using successive differences of carrier-phase measurements, according to one embodiment of the present invention. System 100 can be a microprocessor-based computer system coupled to a GPS receiver 110, which is attached to the moving object and provides raw GPS observables to system 100 for processing. These observables include GPS code and carrier phase measurements, ephemerides, and other information obtained according to signals received from a plurality of satellites 101.

To facilitate differential operations, system 100 may also be coupled to a reference station 120 via a communication link 124. The reference station 120 provides GPS observables measured thereat and/or GPS error corrections calculated thereat. In wide-area or global applications, system 100 may be coupled to one or more central hubs 130 in communication with a group of reference stations (not shown) via radio and/or satellite links 134. The hub(s) 130 receives GPS observables from the group of reference stations and computes corrections that are communicated to the system 100.

In one embodiment of the present invention, system 100 includes a central processing unit (CPU) 140, memory 148, a plurality of input ports 153, 154, and 155, one or more output ports 156, and an optional user interface 158, interconnected by one or more communication buses 152. The input ports 154 are for receiving data from the GPS receiver 110, the reference station 120, and/or the hub 130, respectively, and the output port(s) 156 can be used for outputting calculation results. Alternately, calculation results may be shown on a display device of the user interface 158.

Memory 148 may include high-speed random access memory and may include nonvolatile mass storage, such as one or more magnetic disk storage devices. Memory 148 may also include mass storage that is remotely located from the central processing unit 140. Memory 148 preferably stores an operating system 162, a database 170, and GPS application programs or procedures 164, including procedures 166 implementing a method for navigation using successive changes in carrier-phase measurements according to one embodiment of the present invention. The operating system 162 and application programs and procedures 164 stored in memory 148 are for execution by the CPU 140 of the computer system 100. Memory 148 preferably also stores data structures used during the execution of the GPS application procedures 166, such as GPS measurements and corrections, as well as other data structures discussed in this document.

The operating system 162 may be, but is not limited to, an embedded operating system, UNIX, Solaris, or Windows 95, 98, NT 4.0, 2000 or XP. More generally, operating system 162 has procedures and instructions for communicating, processing, accessing, storing and searching data.

For reasons stated below, the memory 148 may also store a real time executive (RTX) 167, which is a computer program for real time multi-tasking operations. In one embodiment of the present invention, the RTX 167 permits embedding the operating system 162 into the procedures 166 to provide multiple threads, so that different tasks in the procedures 166 can be run "quasi-concurrently," meaning that different tasks may seem to be running at the same time and that system 100 may appear to be doing different jobs simultaneously. This will allow the procedures 166 to include two or more concurrent tasks or processes that are run in different threads. The RTX 167 controls the start and stop of each of the threads and allows the threads to interact with each other. The RTX 167 also allows queuing data to a thread, sending data between threads, and serializing a process by keeping events in order.

In addition, RTX 167 supports standard multithread controls such as allowing the execution of a thread to wait on events that are triggered by events on another thread. An event is a state that can be set or cleared on a thread. When a thread is set to wait on one or more events, the thread is suspended until all of the events are set. This substantially simplifies synchronization and communications among threads. With RTX 167, thread execution is based on priority. The thread with a higher priority runs before the thread with a lower priority. Among threads with the same priority, the threads are executed in a round robin fashion. Each thread is given a time slice in which to run. An off-the-shelf commercial RTX can be used as the RTX 167. Examples of such commercially available real time executives include the CMX-RTX from CMX Systems, Inc., the Concurrent Real time Executive (CORTEX) from Australian Real Time Embedded Systems (ARTESYS) and the Nucleus RTX, from Accelerated Technology Inc.

As indicated by the dashed line 105 in FIG. 1, in some embodiments, the GPS receiver 110 and part or all of the computer system 100 are integrated into a single device, within a single housing, such as a portable, handheld or even wearable position tracking device, or a vehicle-mounted or otherwise mobile positioning and/or navigation system. In other embodiments, the GPS receiver 110 and the computer system 100 are not integrated into a single device.

Figure 2B:
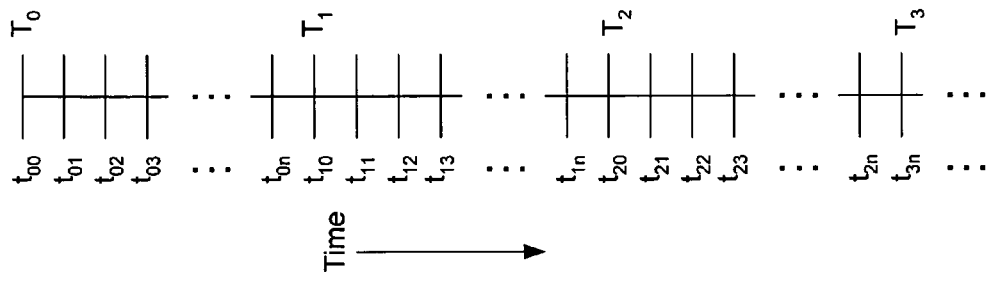
FIG. 2 is a flowchart illustrating a method of navigation using successive differences of carrier-phase measurement.
Figure 2A:
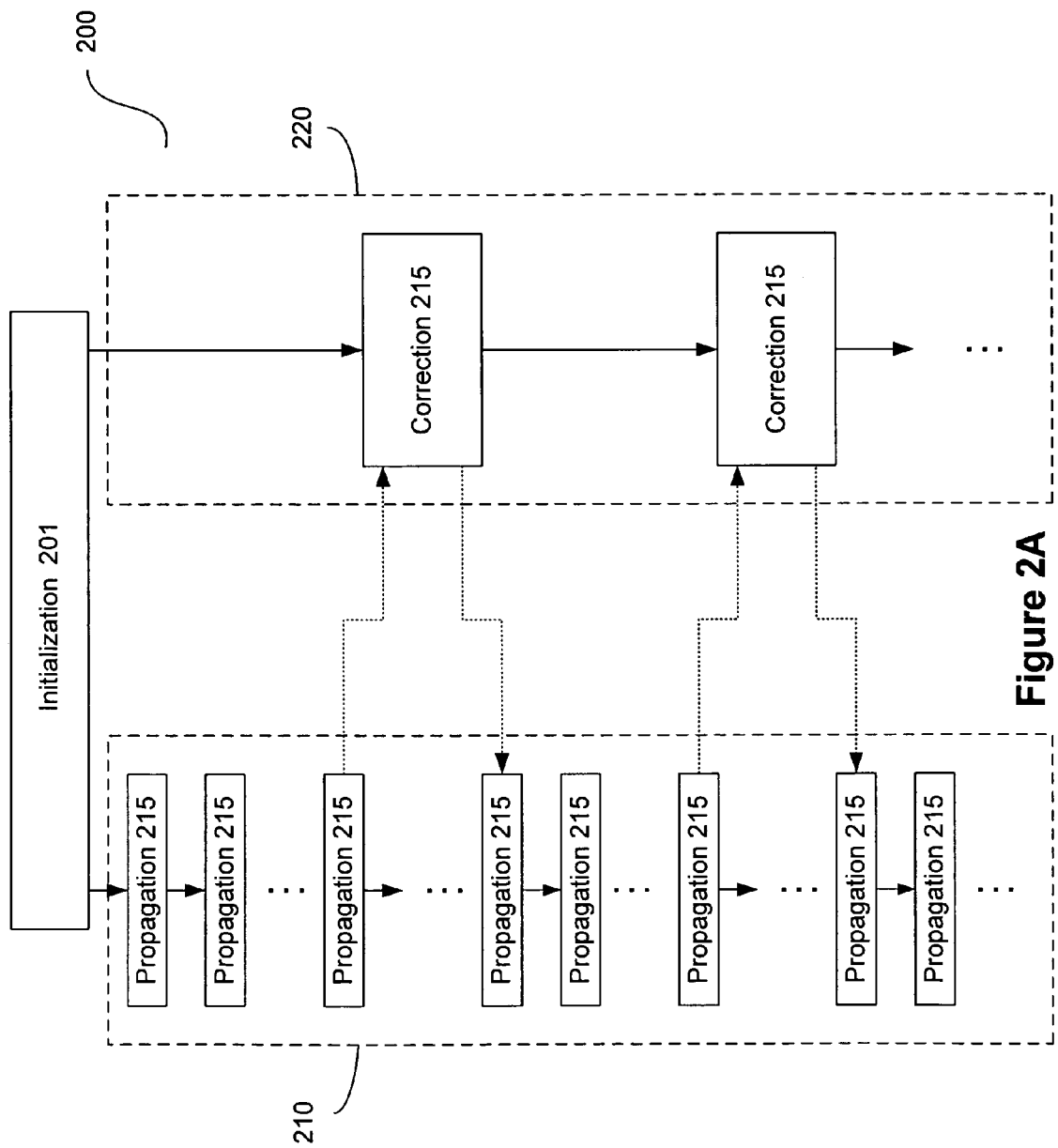

FIG. 2 is a flowchart illustrating a method 200 of navigating the object using successive differences in carrier-phase measurements according to one embodiment of the present invention. Method 200 is implemented in the procedures 167 and can be carried out by system 100. As shown in FIG. 2, method 200 includes an initialization process 201 and two concurrent processes, a high-rate process 210 and a low-rate process 220. The initialization process 201 is used to compute an initial position of the object and other initial parameters required by the high-rate process 210. The high-rate process 210 includes a series of position propagation processes 215 each computing an update to the position of the object in one of a series of minor epochs. The low-rate process 220 includes a series of position correction processes 225 each computing a correction to the position of the object in one of a series of major epochs. As shown in FIG. 2B, there may be a number, such as 10, of minor epochs $t_{mn}$ (m=0, 1, 2, 3, ... and n=0, 1, 2, 3, ...) within each major epoch $T_m$. Depending on the mode of operation, the minor epochs may also coincide with the major epochs, as discussed below.

While any of several conventional satellite navigation methods could be used to compute the initial position in the initialization process, in one embodiment of the present invention, a least-squares process is used to compute the initial position and other initial parameters required by the two concurrent processes 210 and 220. Basically, navigating using measurements with respect to satellites can be described as a discrete-time controlled process governed by a set of linear stochastic difference equations. For each of the satellites involved, an equation can be expressed as $$z = hx + n \quad (1)$$

where x is a state correction vector representing a correction to the state of the discrete-time controlled process, which in this case may include the receiver position and receiver clock time; z represents the value of a measurement innovation, which is defined by the difference between a measurement with respect to a satellite and an expected value for the measurement that is computed from an originally estimated state; n represents the noise in the measurements; and h is a measurement sensitivity vector, which characterizes the sensitivity of the measurement to a change in the state. The h vector is formed by expanding the equation relating the pseudorange measurements with the position of the GPS receiver in a Taylor-series. The elements of h include the first derivatives of the measurement innovation with respect to the correction vector. The state correction vector x includes at least a correction to the position of the GPS receiver. It may also include a correction to the GPS receiver clock. In the case of carrier-phase measurements, the state correction vector may include an unknown ambiguity factor, which can be resolved using a conventional carrier-phase ambiguity resolution technique. For ease of discussion in the following, we will assume the state vector is a four-element vector, i.e., the state includes just the receiver position and the receiver clock time.

Equation (1) can be expanded to relate the state correction vector with a set of measurements with respect to multiple satellites at a common epoch:

$$z = Hx + n \quad (2)$$

In this equation z is a vector consisting of the innovations with respect to the multiple satellites, H is a matrix consisting of the measurement sensitivities with respect to the multiple satellites, x remains as the state vector, and n is a measurement noise vector including a set of measurement noise values associated with the innovations in z. The measurement sensitivity matrix H is dependent on a geometry of the satellites, which refers to a totality of the geometrical relationships between the receiver and the satellites. The measurement innovations in the vector z are often referred to as prefix residuals. The least-squares solution to Equation (2) is:

$$x = (H^T H)^{-1} H^T z \quad (3)$$

where the superscript T represents the transpose operation and the superscript "−1" represents the matrix inverse operation.

An alternative to solving Equation (2) using Equation (3) is to solve for a weighted least-squares solution which is given by:

$$x = (H^T W^{-1} H)^{-1} H^T W^{-1} z \quad (4)$$

where W is a measurement covariance matrix having diagonal elements representing standard deviations of the measurement noises in the noise vector n, and non-diagonal elements representing covariance between measurements. Since the covariance between measurements is generally assumed to be zero, the non-diagonal elements of W are generally zero.

For ease of description, in the following discussions, the simple least-squares equation, Equation (3), is used. Equation (3) can be further simplified to give:

$$x = A H^T z \quad (5a)$$

or $$x = B z \quad (5b)$$

where $A = (H^T H)^{-1}$ and $B = A H^T$.

It is also useful sometimes to form a residual sensitivity matrix, S, which maps the innovations, z, or the prefix residuals, into postfix residuals corresponding to the GPS measurements in the innovations z. The post-fix residuals are represented as elements in a residual vector $\Delta$:

$$\Delta = S z \quad (6)$$

where $$S = (I - H(H^T H)^{-1} H^T) = I - HB \quad (7)$$

where I is a square identity matrix with a rank equal to the number of measurements, or the number of elements in z.

In the initialization process 201, the position correction in the correction vector, x, is added to an originally estimated position to give a corrected estimate of the receiver position. The correction to the receiver clock is often treated as a nuisance parameter and not updated. This is possible because the dependence on the receiver clock is linear and large errors in its value do not affect the solution. Since the range equations, Equations (1)–(7), are non-linear, the entire computation may need to be iterated if the initial position estimate has a large error. Thus, the initialization process 201 may iterate using a same set of measurements obtained in a first epoch, or, alternatively, it may iterated over several sequential measurement epochs. Thus, several major epochs in the initialization process 201 may be taken before an accurate initial position and associated matrices A and H (or B and S) are obtained.

Once the initial position and associated matrices A and H (or B and S) are computed, the high-rate process 210 and the low-rate process 220 are started. The low-rate process 220 computes a correction to the receiver position and the matrices A and H (or B and S) in each major epoch using the position correction process 225, which includes a least-squares computation similar to that described above by Equations (1) through (7). The high-rate process 210 propagates the position of the GPS receiver 110 forward in time by computing an updated position of the GPS receiver 110 in each or a series of minor epochs after the initialization process using the position propagation process 215. In one embodiment of the present invention, the performance of processes 210 and 220 are controlled by the RTX 167, which starts two separate threads after the initialization process 201 to run the processes 210 and 220, respectively. Because the processes 225 are performed with lower frequency than the processes 215 in the high-rate process 210 and because the performance of each process 225 may be contingent on receiving certain computation results from the high-rate process, as explained in more detail below, a higher priority may be given to the thread on which the high-rate process 210 is run and a lower priority may be give to the thread on which the low-rate process 220 is run. The RTX also controls queuing of data on each thread and passing of data between threads, as explained in more detail below.

Figure 3:
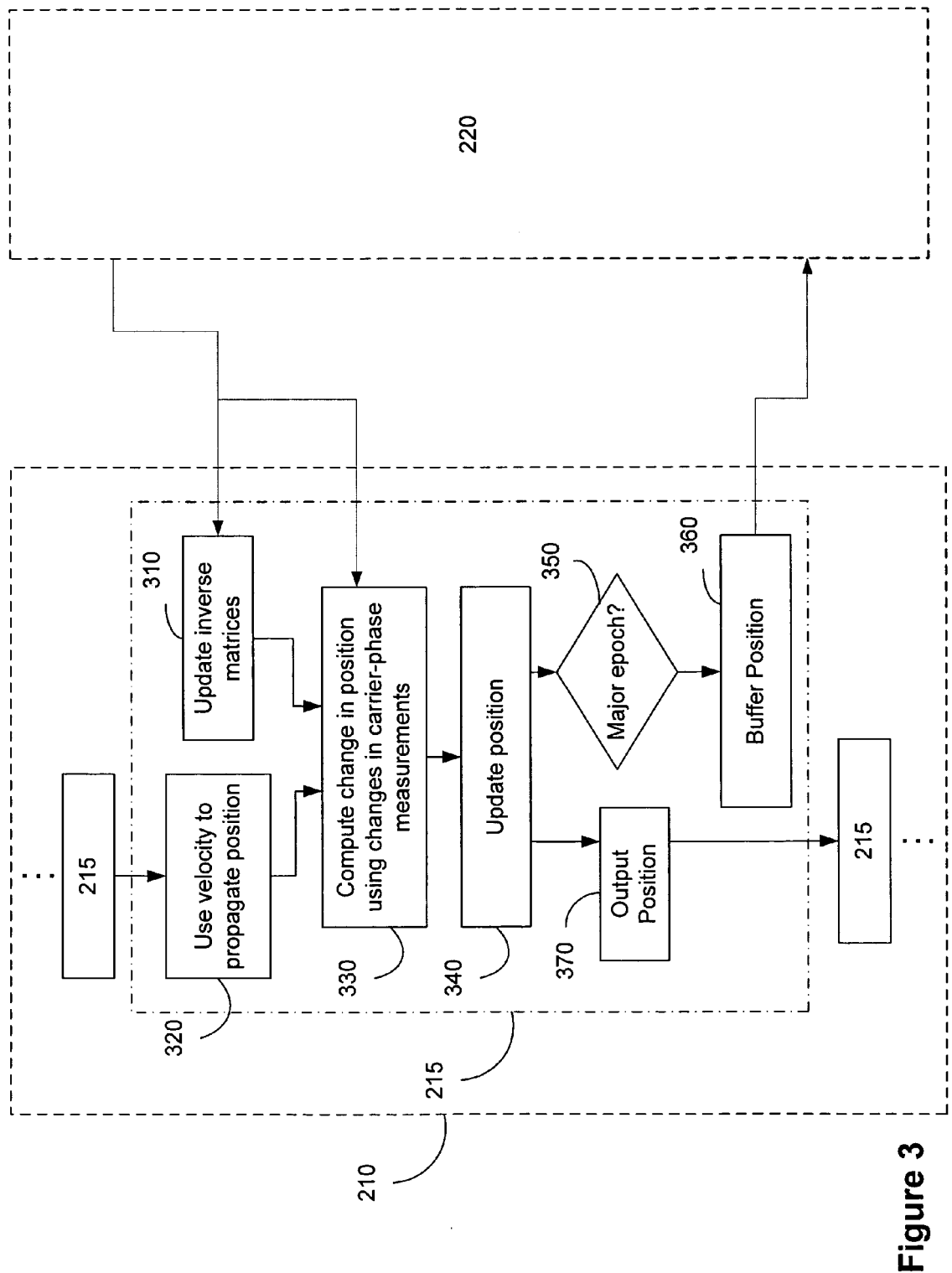
FIG. 3 is a flowchart illustrating in more detail an aspect of the method of navigation according to one embodiment of the present invention.

Because the carrier-phase measurements are typically accurate to less than one centimeter, they can be used to propagate the receiver position forward in time with very little error growth. As shown in FIG. 3, the position propagation process 215 at a current minor epoch in the high-rate process may include a step 310 in which the most recently computed correction to the receiver position and A and H (or B and S) matrices are obtained from a queue associated with the low-rate process 220. The A and H (or B and S) matrices may need to be updated to include contributions from one or more satellites not included in the computation of the matrices by the low-rate process 220, or to delete the contributions from one or more satellites that have produced unreliable measurements. Since the update of the matrices is optional, this part of step 310 is discussed near the end of the description.

Process 215 further includes a step 320, in which the velocity of the GPS receiver 110 is used to compute an approximate propagation of the position. In one embodiment of the present invention, an approximate update to the receiver position at each minor epoch in the high-rate process 210 is first computed by adding to the receiver position computed at a prior minor epoch an initial correction that is the product of the velocity and the elapsed time since the prior epoch. This gives:

$$\vec{X} = \vec{X} + \vec{v} \Delta t \quad (8)$$

where $\vec{v}$ represents the velocity and $\Delta t$ is the elapsed time between two minor epochs or the minor epoch interval, and $\vec{X}$ represents the computed position of the GPS receiver 110. Step 320 is included in the process 215 to ensure that a best position estimate is used in the high-rate correction computation by keeping the innovations (pre-fix residuals) small. This step is not actually required since the position propagation using the change in the carrier-phase as described below should automatically adjust for the absence of the initial correction computed in step 320. Also, the largest contributor to the pre-fix residuals is usually the receive clock error which may or may not be included in the computations in step 320.

Still referring to FIG. 3, process 215 further includes a step 330, in which the changes in carrier-phase measurements during the time interval between the current and prior minor epochs are used to compute the change in the receiver position during that same time interval. The velocity update in step 320 is a good estimate of the receiver position at the current minor epoch. But it does not account for any unmodeled acceleration and velocity noise, which can be corrected by using the changes in the carrier-phase measurements. To compute the change in the position using changes in carrier-phase measurements, Equation (5a) with the A and H matrices from the initialization process (if the current minor epoch is one of the first few minor epochs after the initialization process) or from the high-rate process is used. More efficiently, the B matrix and Equation (5b) may be used. However, if the B matrix is used, the S matrix and Equation (6) may also be used to provide an alternate method of handling cycle slip or loss of signal during the high-rate processing, as discussed below in association with a method for handling the loss of a satellite signal according to one embodiment of the present invention. The S matrix is usually very insensitive to user position. Thus, it needs to be recomputed only if a significant distance has been traversed since the last position correction process 225.

Whether the A and H or B and S matrices are used, because they are computed in the position correction processes 225 once per each major epoch, they can be repeatedly used to compute the high-rate position updates in a sequence of minor epochs with sufficient accuracy, and thus need not be recomputed at each minor epoch. This significantly simplifies the computation load in the high-rate process 210, wherein the only specific values needing to be recomputed at each minor epoch to implement Equation (5a) or Equations (5b) and (6) are the elements of the innovations vector, z. For each satellite involved in the computation of the matrices:

$$z_i = (\phi_i - \rho_i) - (\phi_{i-1} - \rho_{i-1}) \tag{9}$$

where $\phi$ is used to represent the carrier-phase measurement scaled by the corresponding wavelength into meters, and $\rho$ is used to represent the theoretical range between the satellite and receiver. The subscript, i, is used to represent the current epoch and the subscript, i−1, is used to represent the prior epoch. The theoretical range $\rho_i$ may be computed using the receiver position computed in the minor epoch i−1, which may or may not be updated using Equation (8). The theoretical range $\rho_{i-1}$ may simply be computed using the receiver position computed at the minor epoch i−1. It is not updated using Equation (8).

Process 200 can be run in different operational modes. In one embodiment of the present invention, process 200 is run in a mode referred to as the "maximum availability" or "high-rate propagation" mode. In this mode of operation, no corrections for ionospheric, or tropospheric refraction effects need to be used and measurements with respect to satellites as low as a few degrees in elevation can be included when computing the innovations in Equation (9). The refraction effects can be ignored because the changes in the refraction effects over one major interval (i.e., the time period corresponding to each major epoch), which is often about 1 second, are generally below the carrier-phase measurement noise. Thus, the L1 carrier-phase measurements can be used without applying an ionospheric correction from the L2 carrier-phase measurements. Since, the L1 signal is stronger than the L2 signal and the L1 measurements are easier to obtain under marginal conditions, the result obtained using only the L1 measurements can be more robust. Alternatively, when the L2 measurements are available, an average of each L1 and the corresponding L2 carrier-phase measurement (scaled into meters before averaging) can be also be used. This yields slightly less noise in the computed-position because the noises in the L1 and L2 measurements are canceled out to a certain degree during the averaging process.

Thus, the innovations computed using Equation (9) are used in Equation (5a) or (5b) to compute a change x to the state, which include a change $\vec{x}$ to the receiver position $\vec{X}$. A velocity correction $\Delta \vec{v}$ can also be generated from the position change $\vec{x}$ simply by dividing the position change by the minor epoch interval. Thus, the velocity correction is given by:

$$\Delta \vec{v} = \vec{x}/\Delta t \tag{10}$$

When the minor epoch interval is as short as one-tenth of a second, the noise in the state correction x and the velocity correction $\Delta \vec{v}$ may result in an amplified velocity noise. Thus it may be desirable to smooth either the position change in x or the velocity correction, or both, before using them to update the position and velocity. Tracking filters on the state vectors can be used to ensure no error is accumulated in the smoothing process.

Process 215 further includes a step 340, in which the position change generated from the changes in carrier-phase measurements is used to update the receiver position using:

$$\vec{X} = \vec{X} + \vec{x} \tag{11a}$$

where $\vec{x}$ represents the correction to the receiver position $\vec{X}$. In some embodiments, the receiver position $\vec{X}$ is in xyz Cartesian coordinates and in terms of an earth-centered, earth-fixed coordinate system. If $\vec{x}$ is in a north, east, up coordinate system, the position change $\vec{x}$ must first be multiplied by the appropriate rotation matrix, R, which is computed in the low-rate process and transferred to the high-rate process along with the A and H (or B and S) matrices. In this case, $$\vec{X} = \vec{X} + R\vec{x} \tag{11b}$$

where $\vec{x}$ represents the position change in north, east and up coordinates and $\vec{X}$ represents the receiver position in Cartesian coordinates.

Once in every major epoch, the receiver position $\vec{X}$ is further corrected by adding a position correction $\Delta \vec{x}$ to the position change $\vec{x}$ or to the propagated position $\vec{X}$, where the additional correction $\Delta \vec{x}$ is provided by the low-rate process 220, which is discussed in more detail below. The periodic addition of $\Delta \vec{x}$ helps to prevent any inaccuracies in the high rate updates $\Delta \vec{x}$, computed using Equations (8)–(10), from being accumulated. The addition of $\Delta \vec{x}$ may be done in step 330 or step 340 once in every major epoch.

Process 215 further includes a step 350 in which it is determined whether the current minor epoch corresponds to a predetermined period in a major epoch, such as a beginning or an end of the major epoch. When such a correspondence is found, process 215 further includes a step 360 in which the newly computed receiver position $\vec{X}$ is queued for use by the low-rate process 220 to compute a state correction and the A and H (or B and S) matrices. Process 215 may also include a step 370 in which the newly computed receiver position $\vec{X}$ is output from the system 100 through the user interface, the output port 156, and/or other data output mechanisms associated with the system 100. Thereafter, the high-rate process 210 proceeds to the next position propagation process 215 to propagate the receiver position to the next minor epoch using changes in the carrier-phase measurements between the current and the next minor epochs.

Figure 4:
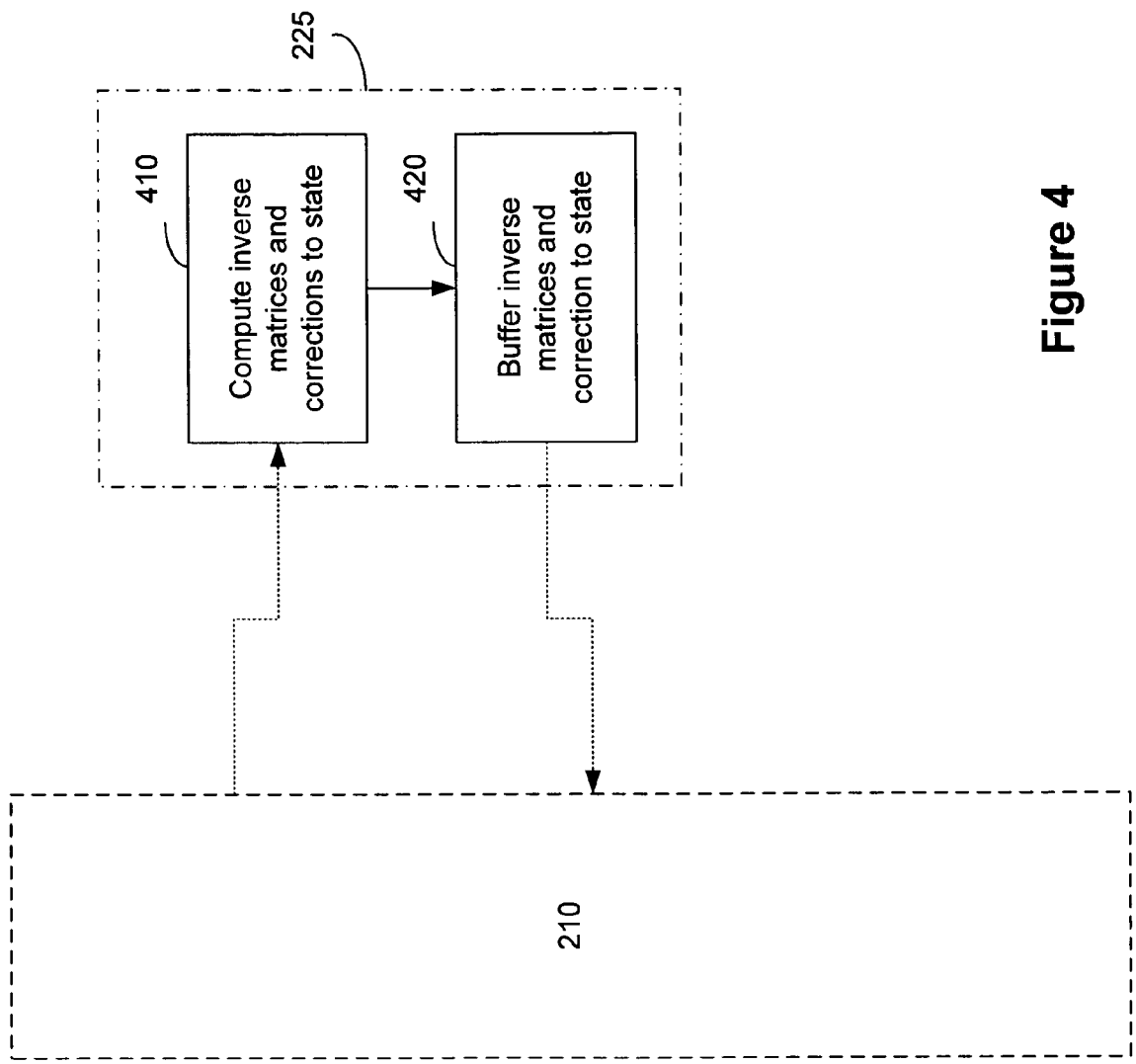
FIG. 4 is a flowchart illustrating in more detail another aspect of the method of navigation according to one embodiment of the present invention.

Although the A and H (or B and S) matrices are relatively insensitive to the receiver position and do not need to be computed in every minor epoch, they still need to be computed often enough so that non-linearity of the Taylor expansion used to obtain Equations (1) or (9) should contribute only an insignificant error. The queuing of the receiver position $\vec{X}$ in step 360, which happens once per each major epoch, triggers the start of a position correction process 225 in the low-rate process 220. As shown in FIG. 4, the position correction process 225 includes a step 410 in which the newly updated receiver position $\vec{X}$ and the GPS measurements corresponding to the specific minor epoch in which $\vec{X}$ is updated are used to compute a state correction and the A and H (or B and S) matrices using Equations (1)–(7). The theoretical range in step 410 is computed based on the newly updated receiver position $\vec{X}$, and is thus assumed to be very accurate so that no iteration is required.

The computation in step 410 may take several minor epochs to complete. The results of the computation need to be made available to the high-rate process 210 as soon as they are produced. Thus, the position correction process 225 further includes a step 420 in which the newly computed state correction and the A and H (or B and S) matrices are queued for use by the high-rate process 210. The newly queued state correction includes the receiver position correction $\Delta \vec{x}$, which is used in step 330 or 340 as discussed above. The clock correction in the newly queued state is used to correct the receiver clock time at which the next set of measurements is to be taken.

As discussed before, the correction vector can be formed in different coordinate systems, one of which uses north, east, and up coordinates rather than the more common, x, y, z, earth-centered, earth-fixed coordinates. The advantage of the north, east, and up coordinate system is that it is much easier to implement a so-called altitude-hold mode if the number of satellites drops to three (or four with poor dilution of precision). In any case, if this alternate mode is employed, the rotation matrix R required to rotate the corrections into the earth-fixed coordinates also needs to be computed in the position correction process 225. This rotation matrix can be queued together with the A and H (or B and S) matrices and the state correction for use by the high-rate process 210.

The reason that the position correction vector $\Delta \vec{x}$ instead of a corrected receiver position is passed to the high-rate process 210 is that several minor epochs in the high-rate process can occur before the computation in step 410 is completed. By passing the correction vector $\Delta \vec{x}$ to the high-rate process 210, a correction can be imposed anytime within a major epoch as discussed above. Passing the position correction vector instead of the corrected receiver position to the high-rate processing also allows the high-rate positioning to be done in an alternative mode, the "maximum accuracy" or "extended accuracy relative navigation" mode, as discussed below.

Figure 5:
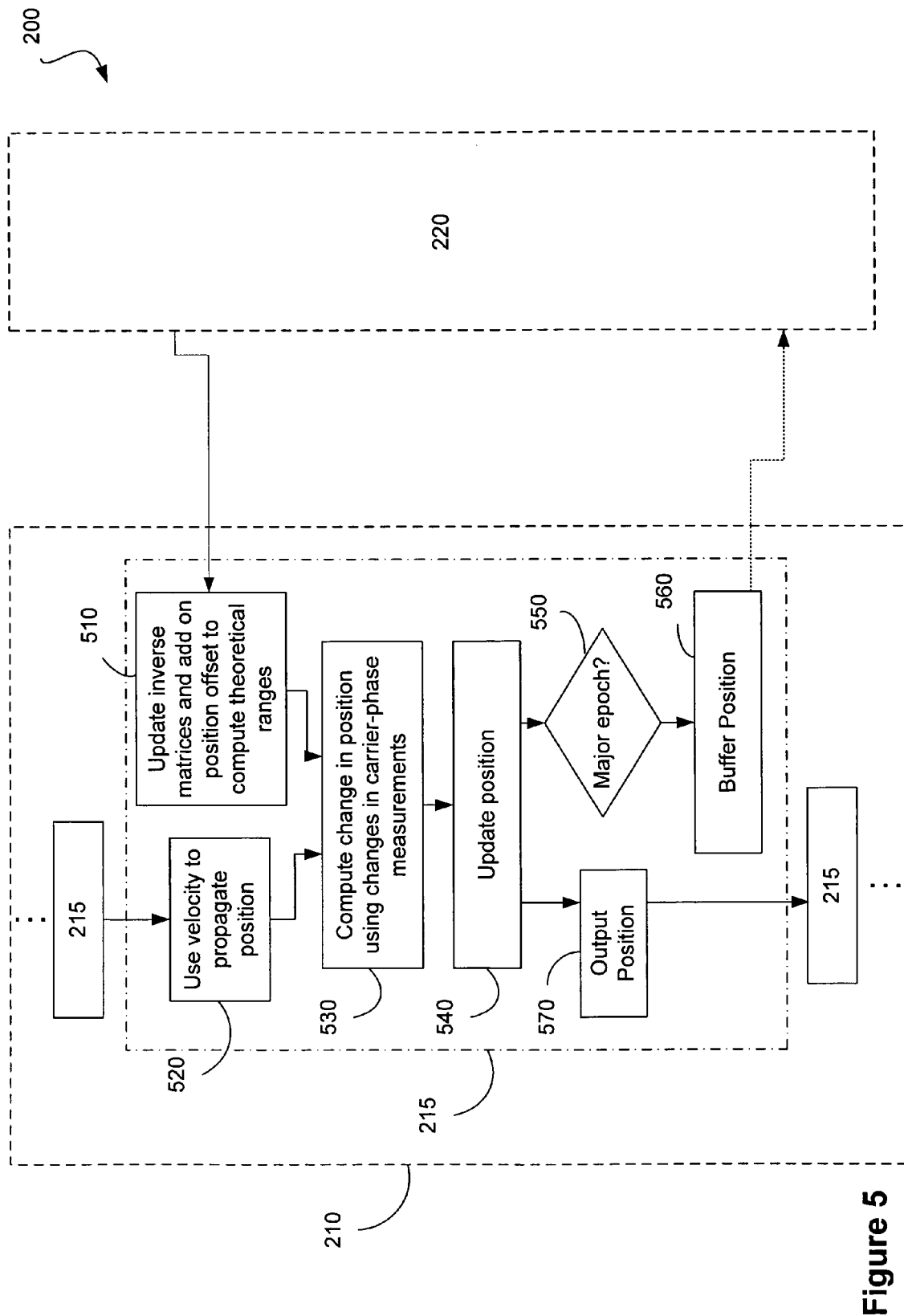
FIG. 5 is a flowchart illustrating in more detail an aspect of the method of navigation according to an alternative embodiment of the present invention.
Figure 6:
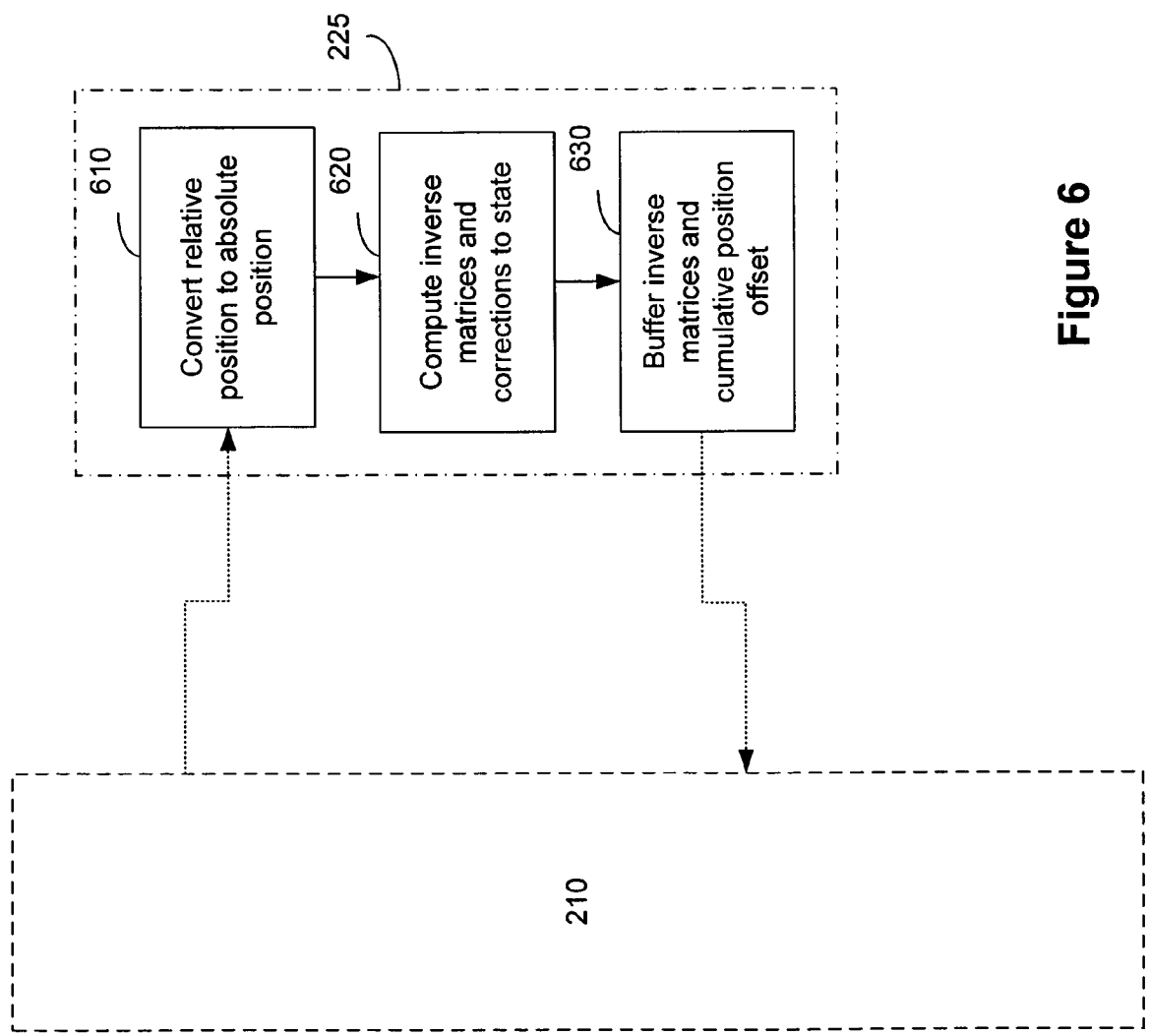
FIG. 6 is a flowchart illustrating in more detail another aspect of the method of navigation according to the alternative embodiment of the present invention.

FIGS. 5 and 6 illustrate the navigation process 200 in the "maximum accuracy" mode, according to an alternative embodiment of the present invention. In this mode of operation, the initial position from the initialization process 201 need not be particularly accurate in an absolute sense. Yet later computed receiver positions relative to that initial position should be very accurate. For example, a user input position can also be used as the initial position. Also in this mode, the position propagation process 215 in the high-rate process 210 can be repeated at a high rate, i.e., once per each $10^{th}$ of a second, or at a low-rate, i.e., once per second. In other word, the minor epochs may coincide with the major epochs when system 100 is operating in this mode. In any case, each position propagation process 215 still depends upon the A and H (or B and S) matrices being computed initially by the initialization process and subsequently by the low-rate process 220.

Furthermore, in the "maximum accuracy" mode, two different coordinate systems can be used by the high-rate process 210 and the low-rate process 220, respectively. In one embodiment of the present invention, the high-rate process 210 computes an update to a "relative" receiver position $\vec{X}^r$ once in each minor epoch using the position propagation processes 215, and the low-rate process 220 computes an offset between the relative receiver position $\vec{X}_r$ and an "absolute" receiver position $\vec{X}$ once per each major epoch using the position correction process 225. The relative position $\vec{X}^r$ is a position that is tied to a specific coordinate system. An example of this is a standard code differential position, with a coordinate system corresponding to that used by a reference receiver associated with a reference station that generates error corrections, such as corrections to GPS code measurements. The absolute position $\vec{X}$ is normally in the earth-centered, earth-fixed Cartesian coordinates. The position offsets from the low-rate process 220 are not applied to the relative positions computed in the high-rate process 210. Instead, they are queued in a separate position offset queue associated with the low-rate process 220. This queue, however, needs to be made available to the high-rate process 210 so that the theoretical ranges can be properly computed. Otherwise, the accuracy of the relative navigation using the high-rate process 210 may be affected by changes in the geometry of the satellites.

As shown in FIG. 5, at a current minor epoch in the high-rate process 210, the position propagation process 215 may include a step 510 in which the most recently computed position offset and A and H (or B and S) matrices are obtained from a queue associated from the low-rate process 220. Optionally, the A and H (or B and S) matrices may need to be updated to account for changes in the positions of the satellites or in the set of satellites contributing to these matrices, as discussed in the description of step 310 above and in more detail below.

Still referring to FIG. 5, process 215 further includes an optional step 520, in which the velocity of the GPS receiver 110 is used to compute an approximate propagation of the relative position $\vec{X}_r$, as discussed above in connection with Equation (8). The velocity update in step 520 can be a good estimate of the receiver position at the current epoch. But it does not account for any unmodeled acceleration and velocity noise, which can be corrected by using the changes in the carrier-phase measurements. Thus, process 215 further includes a step 530, in which the changes in carrier-phase measurements during the time interval between the current and prior minor epochs are used to compute a change in the relative receiver position $\vec{X}^r$ during that same time interval. For this purpose, Equation (5a) with the A and H matrices from the initialization process (if the current minor epoch is one of the first few minor epochs after the initialization process 210) or from the high-rate process is used. More efficiently, especially in this mode of operation, the B and S matrices and Equations (5b) and (6) are used instead.

As discussed before, whether the A and H or B and S matrices are used, there is no need to recompute them at each minor epoch. The only specific values needing to be recomputed at each minor epoch to implement Equation (5a) or Equations (5b) and (6) are the elements of the innovations vector, z, and for each satellite involved in the computation of the matrices:

$$z_i = (\phi_i - \rho_i) - (\phi_{i-1} - \rho_{i-1}) \qquad (12)$$

where $\phi$ is used to represent the carrier-phase measurement scaled by the corresponding wavelength into meters, and $\rho$ is used to represent the theoretical range between the satellite and receiver. The subscript, i, is used to represent the current epoch and the subscript, i−1, is used to represent the prior epoch. The theoretical range $\rho_i$ may be computed using the relative receiver position $\vec{X}^r$ computed in the epoch i−1, which may or may not be updated using Equation (8), and the theoretical range $\rho_{i-1}$ may be computed using the relative receiver position $\vec{X}^r$ computed in epoch i−1, which is not updated using Equation (8). When computing the theoretical ranges, however, it is preferred that absolute receiver positions corresponding to the respective relative positions are used. Approximations of the absolute receiver positions can be computed based on the most-recently computed position offset and the respective ones of the relative receiver positions.

Thus, the innovations computed using Equation (9) are used in Equation (5a) or (5b) to compute a change x to the state, which includes a change $\vec{X}^r$ to the relative receiver position $\vec{X}^r$. A velocity correction $\Delta \vec{v}$ can also be generated from the position change simply by dividing the position change $\vec{x}^r$ by the time interval between two consecutive position propagation processes 215, as in Equation (10).

Process 215 further includes a step 540, in which the position change $\vec{x}^r$ is used to update the relative receiver position $\vec{X}^r$ using:

$$\vec{X}^r = \vec{X}^r + \vec{x}^r \qquad (14)$$

where $\vec{x}^r$ is in the same coordinate system as $\vec{X}^r$. If $\vec{x}^r$ is in a different coordinate system from that of $\vec{X}^r$, a rotation matrix may be used to convert $\vec{x}^r$ to the same coordinate system as $\vec{X}^r$. The rotation matrix may be computed in the low-rate process and transferred to the high-rate process along with the A and H (or B and S) matrices.

In the "maximum accuracy" mode of operation, to compute the innovations in Equation (9), all known error factors should be considered so as to minimize any position error growth when the receiver position is being updated using the changes in the carrier-phase measurements in the high-rate process. Specific steps taken to maintain accuracy include using the L2 carrier-phase measurements to correct for ionospheric effects in the innovations. This increases noise in high-frequency measurements slightly, but removes a position drift that would occur over time if the ionospheric effects were not accounted for. In a similar fashion and for the same reason, changes in the tropospheric refraction effects over each minor epoch interval between two consecutive position propagation processes 215 should be computed and removed from the innovations. Finally, for even better accuracy and longer relative navigation, the innovations in step 530 should be adjusted by any available wide-area or global differential GPS corrections. Specifically, any changes in the corrections to the satellite clock or orbit that occur during the minor epoch interval between two consecutive position propagation processes 215 should be applied to the innovations. The clock and orbital corrections can be obtained from one of various wide-area or global satellite navigation systems, such as the StarFire global differential system available from John Deere and Company of the United States of America.

Other noise factors and biases may also be considered to improve accuracy. For example, though the effect is small, the product of any difference in the satellite clock frequency from its design value and the duration of the minor epoch interval can be used to adjust the corresponding carrier-phase measurements. Failure to consider this difference in the satellite clock frequency can result in a ramp of about one centimeter per second, which can lead to an error of about one-centimeter per second in the computed velocity.

In the "maximum accuracy" mode of operation, the position offset computed by the low-rate process 220 is not applied to further correct the relative position $\vec{X}^r$, because doing so would cause the navigated position $\vec{X}^r$ to drift back toward a true geodetic position or an "absolute" position.

Thus, the "maximum accuracy" mode is a relative navigation mode and can be used to maintain high relative accuracy of short-distance RTK positioning when the communication link 124 between the reference station 120 and the rover receiver 110 is temporarily lost, even when the position of the reference station 120 is not particularly accurate to begin with. Since the error corrections are provided by the reference station 120 or computed based on the measurements obtained at the reference station 120 and transmitted to the system 100, when the communication link 124 between the system 100 and the reference station 120 is temporarily lost, the last received or computed error corrections can be repeatedly used until the communication link is resumed. Because the error corrections do not usually change significantly over a short time period, such as a few seconds to a few minutes, the repeated use of the corrections over that time frame should not significantly affect the accuracy of the computation results.

If there are several minor epochs in a major epoch, process 215 further includes a step 550 in which it is determined whether the current minor epoch corresponds to a predetermined period in a major epoch, such as a beginning or an end of the major epoch. When such a correspondence is found, or when the minor epochs actually coincide with the major epochs, process 215 further includes a step 360 in which the newly computed relative receiver position $\vec{X}^r$ is queued for use by the low-rate process 220 to compute the next position offset and the A and H (or B and S) matrices. Process 215 may also include a step 570 in which the newly computed relative receiver position $\vec{X}^r$ is output from the system 100 through the user interface, the output port 156, and/or other data output mechanisms associated with the system 100. Thereafter, the high-rate process 210 proceeds to the next position propagation process 215 to propagate the relative receiver position $\vec{X}^r$ further in time using changes in the carrier-phase measurements between the current and the next minor epochs.

The queuing of the relative receiver position $\vec{X}^r$ in step 560, which happens once per each major epoch, triggers the start of a position correction process 225 in the low-rate process 220. As shown in FIG. 6, the position correction process 225 in the "maximum accuracy" mode of operation includes a step 610 in which the most recently computed relative receiver position $\vec{X}^r$ is obtained. This relative position $\vec{X}^r$ is converted in step 610 to an absolute position using the position offset queued in the last position correction process 225 to get a good estimate of the absolute receiver position $\vec{X}$.

With the estimated absolute receiver position, the position correction process 225 further includes a step 620 in which a state correction and the A and H (or B and S) matrices are computed using Equations (1)–(7) with the theoretical range being computed using the estimated absolute receiver position. The theoretical range thus computed is assumed to be sufficiently accurate so that no iteration is required. From the newly computed state correction, a new offset is also computed in step 620 by adding the position correction in the state correction to the most recently queued position offset. The position correction process 225 further includes a step 630 in which the newly computed position offset and the A and H (or B and S) matrices are queued for use by the high-rate process 210, as discussed above.

As discussed above, in step 310 or 510, the A and H (or B and S) matrices may be updated to account for a possible change in the number of satellites. Even though the matrix, A, is very insensitive to the receiver position, it may need to be recomputed or adjusted if there has been a change in the number of satellites since the matrices were last computed. For example, a cycle-slip or loss of lock on one satellite means that measurements with respect to that satellite need to be removed from the computation and that a different matrix, A, should be computed. The H matrix can easily be adjusted by simply deleting, or, in the case of an increasing number of satellites, adding the row corresponding to the satellite in the H matrix. To recompute A from the H matrix is computationally intensive and would negate much of the advantage obtained from the high-rate processing. However, the computation necessary to adjust the A matrix for the removal (or addition) of a satellite is fairly simple. Specifically, a vector, r, whose elements are the dot product of the unadjusted A matrix and the row associated with the satellite being deleted (or added) in the H matrix, is computed:

$$r_i = \sum_j a_{i,j} h_j^k \quad (15)$$

where the $a_{ij}$ represents the element in the jth row and jth column of matrix A, and $h_j^k$ represents the jth element in the row associated with the to be removed (or added) satellite k in the H matrix. A scalar, s, is also computed which contains the dot product of r with the same row of H, i.e., $$s = 1 - \sum_i r_i h_i^k \quad (16)$$

The adjustment to the elements of A is given by:

$$a_{i,j} = a_{i,j} + \frac{r_i r_j}{s} \quad (17)$$

Equations (16) and (17) are specific for removing a satellite from the A matrix. To add a satellite requires that the minus sign in equation (16) be switched to a plus sign and the plus sign in equation (17) to be switched to a minus sign.

For the weighted least squares computation, Equations (15)–(17) can be modified by multiplying each H element by the corresponding standard deviation (weight) of the measurement noise in the measurement covariant matrix W, and by replacing the "1" in equation (16) with the inverse of the weight squared.

An alternative method for handling the loss of a satellite signal is to use the row of the S matrix associated with the "lost" satellite to compute a temporary replacement of the innovation or pre-fix residual with respect to the lost satellite until the completion of the next position correction process 225 in the low-rate process 220. Specifically, assume that the pre-fix residual for the $j^{th}$ satellite is missing, because we know that the post-fix residual should be very near zero, we can set it to zero and solve for the replacement pre-fix residual. This ensures that the missing measurement has no effect on the answer, and as long as at least four valid measurements remain, a valid solution can be obtained. Specifically, using equation (6) and setting the post-fix residual or the product of the associated $j^{th}$ row of the S matrix and the innovations to zero, we get $$0 = \sum_{i=1}^{n} s_{i,j} z_i. \quad (18)$$

Since Equation (18) is a single equation with one unknown, it can easily be solved to obtain the replacement innovation $z_j$. If multiple measurements are missing, an equation of the form of (18) can be formed for each. Thus, there will be as many equations as there are unknowns, and the equations can be solved as long as there are at least four good measurements.

If a new measurement (i.e., for an additional satellite) needs to be added, rather than forming a new S matrix, the simplest procedure is to wait until the completion of the next position correction process 225 in the low-rate process 220 wherein the new measurement is considered.

Sometimes, the GPS carrier-phase measurements used in the computations in the process 200 may need to be edited to insure their reliability. In one embodiment of the present invention, the reasonableness of the measurements are tested right after the computation of the innovations using Equation (9) in step 330 or 530 in the high-rate process. Since the largest contributor to the innovations is almost always the change in the receiver clock value, one could remove the contributions from the receiver clock and then edit. The same effect, however, can be easily achieved using a method illustrated in FIG. 7.

As shown in FIG. 7, according to one embodiment of the present invention, a process 700 for testing the reasonableness of the measurements includes a step 710 in which the innovations are rank ordered according to their values. Process 700 further includes a step 720 in which the difference between the largest value and the next largest value and the difference between the smallest value and the next smallest value among the innovations are obtained. Process 700 further includes a step 730 in which the larger one of these two differences is tested against a threshold value.

This way, any large outlying value among the GPS measurements are detected. A proper threshold value is a function of the dynamics of the moving GPS receiver. If the velocity is used to propagate the position forward before the innovations are computed, the error due to dynamics is dominated by an acceleration term. If the expected dynamics is less than one "g" and the high-rate computation is at 10 Hertz, the acceleration can contribute at most about 5 centimeters to the innovations. Thus, if the dynamics are less than one "g" it should be easy to detect a single carrier-phase cycle-slip using the editing technique in process 700.

For higher dynamics, the editing technique in process 700 needs to use a higher threshold and a single cycle-slip in the carrier-phase measurements cannot be detected. However, if six or more satellites are available, the post-fix measurement residuals can be tested using one of various RAIM techniques to detect and eliminate even single cycle-slip errors. An example of such a RAIM technique can be found in a co-owned patent application, entitled "Method for Receiver Autonomous Integrity Monitoring and Fault Detection and Elimination," U.S. patent application Ser. No. 10/656,956, which is incorporated herein by reference. By using the S matrix to map the innovations to the post-fix residuals, via equation (6), very powerful editing can be performed. This is because the post-fix residuals are generally at the centimeter level or below.

In conclusion, the present invention includes a process in which the changes in the carrier-phase measurements can be used to propagate the receiver position forward in time with very high accuracy and low computational burden. For example, the process can be used when the receiver is operating in a stand-alone mode, in a local or wide-area differential mode, or even in a carrier-phase differential (RTK) mode. Two modes of operation, in which significant benefit from this high-accuracy, high-rate position propagation process can be reaped, have been described in detail. The process should work equally well in other modes of operation with some modifications apparent to those skilled in the art.

We claim:

1. A method for navigating an object according to signals from satellites, comprising:
    determining at least one matrix for solving for a change in position of the object based on a measurement sensitivity matrix associated with a current geometry of the satellites; and
    repeatedly using the at least one matrix to determine subsequent changes in the position of the object based on successive changes in carrier-phase measurements obtained at the object according to signals from the satellites.

2. The method of claim 1 further comprising:
    updating the at least one matrix after the at least one matrix has been repeatedly used to determine the changes in the position of the object for a period of time.

3. The method of claim 2, further comprising:
    repeatedly using the updated at least one matrix to determine subsequent changes in the position of the object based on successive changes in the carrier-phase measurements until a new update of the at least one matrix is computed.

4. A process for navigating an object, comprising:
    an initialization process for determining an initial position of the object;
    a first process for determining a position update of the object once per each of a series of minor epochs after the initialization process, the position update being determined based on differences in carrier-phase measurements obtained during consecutive minor epochs; and
    a second process for determining, in a respective major epoch of a series of major epochs, at least one matrix for solving for a change in position of the object based on a measurement sensitivity matrix associated with a current geometry of the satellites;
    wherein the first process repeatedly uses the at least one matrix determined by the second process to determine subsequent changes in the position of the object based on successive changes in carrier-phase measurements obtained at the object according to signals from the satellites.

5. The process of claim 4 further comprising applying the position correction to a position update obtained after the determination of the position correction.

6. The process of claim 4 wherein the at least one matrix is corrected by the first process to account for changes in a number of satellites with respect to which reliable measurements are obtained.

7. The process of claim 4 wherein the first process further comprises using a velocity of the object to compute an approximate position update before determining the position update based on differences in carrier-phase measurements obtained at two consecutive minor epochs.

8. The process of claim 4 wherein the position correction in the second process is determined using a least-squares method.

9. The process of claim 4 wherein the first process and the second process are performed concurrently using a real-time executive.

10. The process of claim 4 wherein the position update is determined in the first process without including corrections for ionospheric, or tropospheric refraction effects related to the satellites.

11. The process of claim 4 wherein each position update is an update of a relative position of the object and the second process determines a position correction comprising an offset between a relative position and an absolute position of the object.

12. The process of claim 4 wherein corrections for ionospheric and tropospheric refraction effects are included in determining the position updates.

13. The process of claim 12 wherein the carrier-phase measurements used to determine the position updates are adjusted using dual-frequency carrier-phase measurements to remove ionospheric refraction effects.

14. The process of claim 4 wherein corrections from a wide-area or global positioning system are used in determining the position updates.

15. A computer readable medium storing therein computer readable instructions that when executed by a processor cause the processor to perform a process for navigating an object according to signals from satellites, the computer instructions comprising:
    instructions for determining at least one matrix for solving for a change in position of the object based on a measurement sensitivity matrix associated with a current geometry of the satellites; and instructions for repeatedly using the at least one matrix to determine subsequent changes in the position of the object based on successive changes in carrier-phase measurements.

16. The computer readable medium of claim 15 including instructions for updating the at least one matrix after the at least one matrix has been repeatedly used to determine the changes in the position of the object for a period of time.

17. The computer readable medium of claim 16 wherein the instructions further comprise:
instructions for repeatedly using the updated at least one matrix to determine subsequent changes in the position of the object based on successive changes in the carrier-phase measurements until a new update of the at least one matrix is computed.

18. A system for navigating an object, comprising:
a satellite receiver for receiving signals from satellites;
a processor;
instructions, executable by the processor, for determining at least one matrix for solving for a change in position of the object based on a measurement sensitivity matrix associated with a current geometry of the satellites; and
instructions, executable by the processor, for repeatedly using the at least one matrix to determine subsequent changes in the position of the object based on successive changes in carrier-phase measurements.

19. The system of claim 18, including instructions, executable by the processor, for updating the at least one matrix after the at least one matrix has been repeatedly used to determine the changes in the position of the object for a period of time.

20. The system of claim 18, including instructions, executable by the processor, for repeatedly using the updated at least one matrix to determine subsequent changes in the position of the object based on successive changes in the carrier-phase measurements until a new update of the at least one matrix is computed.

* * * * *